US005687870A

United States Patent [19]
Carlile et al.

[11] Patent Number: 5,687,870
[45] Date of Patent: Nov. 18, 1997

[54] PRESSURE LOCK ASSEMBLY AND PRESSURE VESSEL

[75] Inventors: Dana Andrew Carlile, Webster; David Edward Foeller, Batavia; Kenneth Dean Corby, Rochester, all of N.Y.

[73] Assignee: Eastman Kodak Company, Rochester, N.Y.

[21] Appl. No.: 610,531

[22] Filed: Mar. 4, 1996

[51] Int. Cl.$^6$ ................................................. B65D 45/00
[52] U.S. Cl. ................................................. 220/316
[58] Field of Search ........................... 220/316, 203.01, 220/203.19

[56] References Cited

U.S. PATENT DOCUMENTS

| | | | |
|---|---|---|---|
| 2,410,214 | 10/1946 | Higginson et al. | 220/40 |
| 2,614,722 | 10/1952 | Wyman | 220/316 X |
| 2,917,200 | 12/1959 | Phelan et al. | 220/55.3 |
| 2,970,718 | 2/1961 | Everest et al. | 220/55.3 |
| 4,159,063 | 6/1979 | Weber et al. | 220/316 |
| 4,161,260 | 7/1979 | Lagostina et al. | 220/316 |
| 4,413,652 | 11/1983 | Allewitz | 220/316 X |
| 4,433,579 | 2/1984 | Horn | 220/316 X |
| 4,620,643 | 11/1986 | Sebillotte | 220/316 |
| 4,796,776 | 1/1989 | Dalquist et al. | 220/203 |
| 4,840,287 | 6/1989 | Brewer et al. | 220/316 |
| 5,148,938 | 9/1992 | Morgan, Jr. | 220/316 |
| 5,176,276 | 1/1993 | Ballu | 220/240 |
| 5,297,473 | 3/1994 | Thelen et al. | 99/337 |
| 5,317,959 | 6/1994 | Beluzzi | 99/337 |

FOREIGN PATENT DOCUMENTS

WO 93/18798   9/1993   WIPO ................................. 422/21

*Primary Examiner*—Steven M. Pollard
*Attorney, Agent, or Firm*—Robert Luke Walker

[57] ABSTRACT

A pressure lock assembly for use between first and second independently pressurized areas and a pressure vessel incorporating such a lock assembly. The pressure lock assembly is automatically actuated when the first area has a substantially higher pressure than the second area and is automatically deactuated when the areas have substantially uniform pressures. The pressure lock assembly has first and second body members. The first body member has an inner surface bounding the first area, an outer surface bounding the second area, and a through-opening extending between the surfaces. The body members are displaceable between an open position in which the body members are at least partially disengaged and a closed position in which the body members are closely engaged. A flexure member is disposed adjacent the inner end of the through-opening. When the two independently pressurized areas have substantially uniform pressures, the flexure member is disposed in a relaxed configuration in which the flexure member is unsealed from the first body member. When the first area has a substantially higher pressure than the second area, the flexure member is disposed in a pressurized configuration, in which the flexure member is sealed against the first body member. A latch is disposed on the first body member. The latch has a stem, a catch, and a foot. The stem extends through the through-opening in the first body member. The catch and foot are disposed at opposite ends of the stem. The latch is movable by the flexure member, relative to the first body member; from a uniform pressure position, in which the first body member is displaceable from the second body member and the flexure member is in communication with the through-opening; to a differential pressure position, in which the catch retains the first body member against the second body member in pressure-tight relation and the foot seals the through-opening from the flexure member.

20 Claims, 4 Drawing Sheets

1

PRESSURE LOCK ASSEMBLY AND PRESSURE VESSEL

CROSS-REFERENCE TO RELATED APPLICATION

This application is related to a United States Patent Application, entitled "METHOD FOR HEATING AND VENTING A CONTAINER", filed by Ken Corby, Dave Foeller, Dana Carlile, Jacob Shmois, Fugui He, Steve Mruczek, concurrently with this application; which application is hereby incorporated by reference herein.

This application is related to a United States Patent Application, entitled "APPARATUS FOR HEATING AND VENTING A CONTAINER", filed by Ken Corby, Dave Foeller, Dana Carlile, Jacob Shmois, Fugui He, Steve Mruczek, concurrently with this application; which application is hereby incorporated by reference herein.

FIELD OF THE INVENTION

The invention relates to apparatus for latching to secure closure of a container, and more particularly to a pressure lock assembly and pressure vessel.

BACKGROUND OF THE INVENTION

Devices for treating articles by elevating temperature and pressure are well known. Two such devices, for example, are the pressure cooker and the autoclave. Each one relies on the action of water vapor, or steam, at a pressure of up to several atmospheres above ambient and a temperature of, typically, 150° C. or higher. Many other processes are known, both aqueous and non-aqueous, which utilize a pressure gradient across a barrier.

These processes present a two-fold risk of severe injury to human operators. If the closing mechanism of a pressure vessel fails or if a container under pressure is inadvertently opened, an operator can be severely burned or scalded. Similar, but lesser risks apply for a number of other pressure gradients. For this reason, a myriad of types of safety closures have been proposed which are actuated in various ways by a pressure gradient across a barrier and which are deactivated by the elimination of the gradient. Many of these mechanisms are complex or difficult to use, or present a risk of inadvertent opening.

U.S. Pat. No. 4,840,287 to Brewer et al. discloses a pressure-actuated locking lever in a threaded rotary first body member for a pressure cooker, which lever engages a flange in the body of the cooker to prevent opening of the first body member in the event the cooker is under pressure. The lever is caused to pivot to a non-interfering position by a spring when the internal pressure in the cooker is reduced. The spring stem is at a mechanical disadvantage, however, and failure or clogging of the spring could render the vessel impossible to open, as the locking mechanism is inaccessible from outside the closed cooker.

U.S. Pat. No. 4,159,063 to Weber et al. discloses a pressure-actuated slide bolt in the first body member for a superpressurized container which engages a bore in the body of the container when pressure is exerted on a flexible inner lid of the container, which pressure is transmitted to the bolt by a counterpoise. The bolt is retractable by a spring, the counterpoise is at a severe mechanical disadvantage, and none of the locking apparatus is accessible from outside the vessel.

An application of particular interest is in the safety locking of small cassettes containing pressure pouches in desk-top miniature autoclaves. WO93/18798 filed by Kutner et al. discloses a two part, single-hinged cassette having a longitudinally slidable lock to secure the mating edges opposite the hinge. The cassette is intended to contain a flexible pouch which may contain, for example, dental tools to be sterilized by generation of steam at elevated temperature within the pouch. The cassette further has a bore through the first body member to communicate with the internal space containing the pouch. The bore contains an outwardly slidable stop which may be forced outward by pressure in the pouch to interfere with a flange on the slidable lock, thereby preventing opening of the cassette while the pouch is pressurized. The slidable stop is intended to return to its non-engaged position by gravity, which limits the orientations permissible for the stop and the cassette.

U.S. patent application Ser. No. 08/222,211 filed Apr. 4, 1994 by Corby et al. discloses a container and shielded pouch apparatus for use in sterilizing dental tools in a microwave oven. No provision is made in the container to use internal pressure to prevent opening by an operator while such pressure still exists in the pouch.

It therefore would be desirable to provide a pressure lock assembly and pressure vessel which are relatively simple, easy to use, and difficult to open inadvertently.

SUMMARY OF THE INVENTION

The invention is defined by the claims. The invention, in its broader aspects, provides a pressure lock assembly for use between first and second independently pressurized areas and a pressure vessel incorporating such a lock assembly. The pressure lock assembly is automatically actuated when the first area has a substantially higher pressure than the second area and is automatically deactuated when the areas have substantially uniform pressures. The pressure lock assembly has first and second body members. The first body member has an inner surface bounding the first area, an outer surface bounding the second area, and a through-opening extending between the surfaces. The body members are displaceable between an open position in which the body members are at least partially disengaged and a closed position in which the body members are closely engaged. A flexure member is disposed adjacent the inner end of the through-opening. When the two independently pressurized areas have substantially uniform pressures, the flexure member is disposed in a relaxed configuration in which the flexure member is unsealed from the first body member. When the first area has a substantially higher pressure than the second area, the flexure member is disposed in a pressurized configuration, in which the flexure member is sealed against the first body member. A latch is disposed on the first body member. The latch has a stem, a catch, and a foot. The stem extends through the through-opening in the first body member. The catch and foot are disposed at opposite ends of the stem. The latch is movable by the flexure member, relative to the first body member; from a uniform pressure position, in which the first body member is displaceable from the second body member and the flexure member is in communication with the through-opening; to a differential pressure position, in which the catch retains the first body member against the second body member in pressure-tight relation and the foot seals the through-opening from the flexure member.

It is an advantageous effect of at least some of the embodiments of the invention that a pressure lock assembly and pressure vessel are provided which are relatively simple, easy to use, and difficult to open inadvertently.

BRIEF DESCRIPTION OF THE FIGURES

The above-mentioned and other features and objects of this invention and the manner of attaining them will become more apparent and the invention itself will be better understood by reference to the following description of embodiments of the invention taken in conjunction with the accompanying figures wherein.

DESCRIPTION OF PARTICULAR EMBODIMENTS

The pressure lock assembly of the invention is used between two independently pressurized areas. The pressure lock assembly is actuated by pressure when the pressure in the first area becomes substantially higher than the pressure in the second area. The pressure lock assembly remains actuated until pressures in the two areas become substantially uniform; the pressure lock assembly then deactuates.

Figure 1:
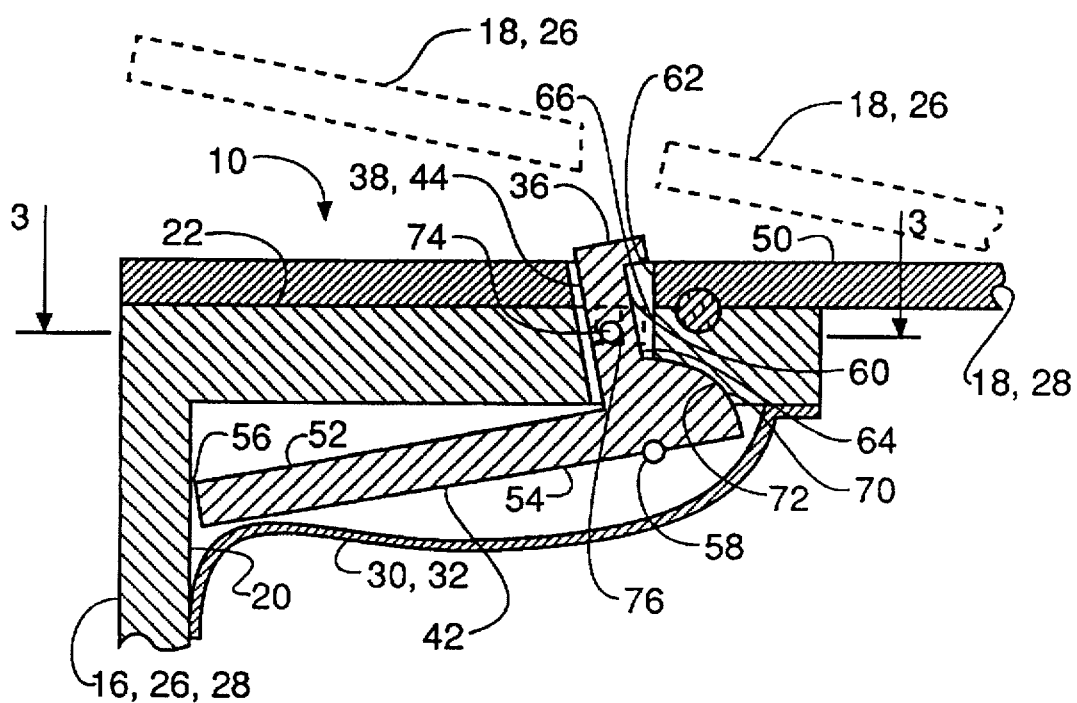
FIG. 1 is a cross-sectional view of an embodiment of the pressure lock assembly of the invention. The latch is in a uniform pressure position. The second body member is shown in an open position in dashed lines and in a closed position in solid lines.
Figure 2:
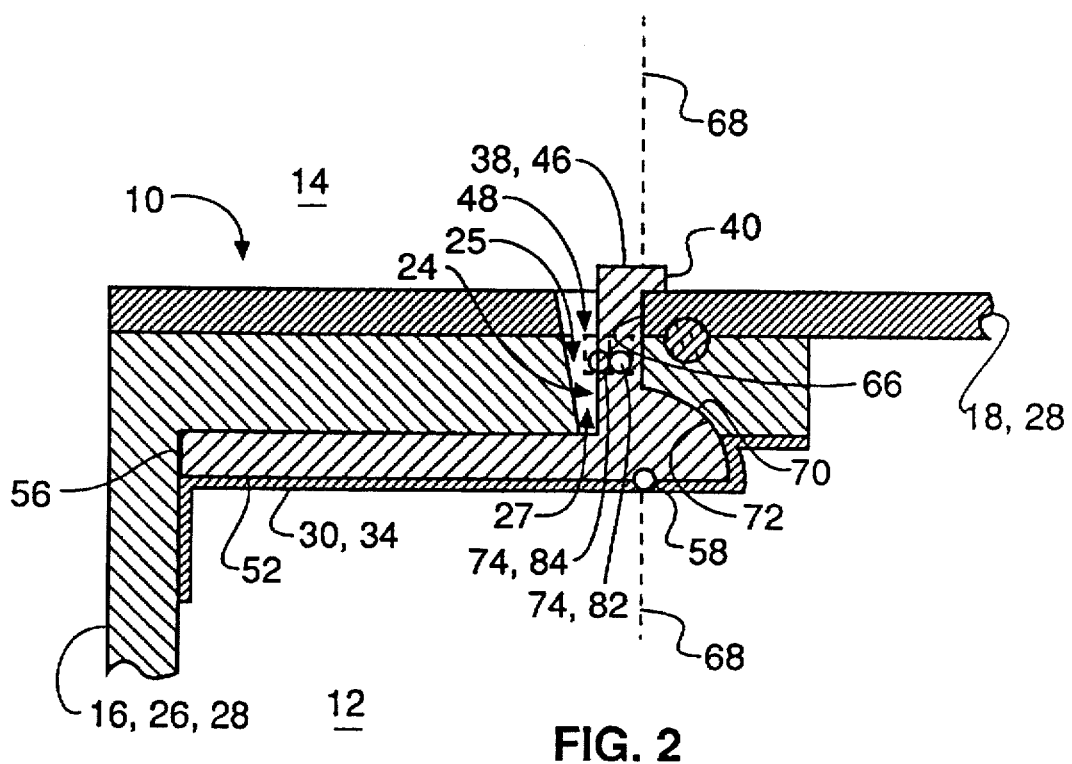
FIG. 2 is the same view as FIG. 1, except the latch is in a differential pressure position.

Referring now to primarily to FIGS. 1 and 2, the pressure lock assembly 10 has first and second body members 16,18. The first body member 16 has an inner or high pressure surface 20 that bounds the first independently pressurized area 12 and an outer or low pressure surface 22 bounds the second independently pressurized area 14. The first body member 16 has a through-opening 24 that extends between the inner and outer surfaces 20,22. The through-opening 24 has exterior and interior ends 25,27. ("Exterior", "interior", and like terms are used herein in a relative sense and do not limit the positioning of the latch assembly relative to a larger structure or the greater environment.) The body members 16,18 are displaceable between an open position 26 (indicated for body member 18 by dashed lines in FIG. 1) and a closed position 28 (indicated by solid lines in FIG. 1). In the open position 26, body members 16,18 are disengaged or partially disengaged. In the closed position 28, the body members 16,18 are closely engaged in pressure-tight relation.

The manner in which the body members are displaceable relative to each other is not critical to the invention. For example, the body members can be hinged relative to each other, or one can slide relative to the other, or one can rest on the other. The general configurations of the body members are not critical features of the invention. The body members can be flat or curved. The body members can include one or more loosely-held or permanently attached gaskets or other pressure retentive structures. The body members can be completely rigid or can be slightly flexible, in whole or in part. The body members can each be joined to large structures, for example, a door and a door frame, that themselves provide for relative movement of the body members. The body members can themselves form all or a major part of a discrete article. In an embodiment of the invention discussed in detail below, the body members form the shell of a pressure vessel.

A flexure member or membrane 30 is disposed adjacent the inner end 27 of the through-opening 24. When the first and second areas 12,14 have substantially uniform pressures, the flexure member 30 is in a relaxed configuration 32, in which the flexure member 30 is unsealed from the first body member 16 and is loosely disposed in proximity to the first body member 16. When the first area 12 has a substantially higher pressure than the second area 14, the flexure member 30 is in a pressurized configuration 34, in which the flexure member 30 is sealed against and presses tightly against the first body member 16. The specific configuration of the flexure member 30 is not critical. The flexure member can be a flexible, polymeric pouch that inflates when pressurized. The flexure member can be a single thickness of the same or a similar material. The flexure member can be loose or can be held in place in some manner. For example, the flexure member can be fixed to the foot of the latch (discussed below in detail) where the two overlap. If the flexure member is a pouch or the like, the flexure member may position itself relative to the first body member as the flexure member inflates. If the flexure member is a loose sheet of material, then it may be necessary to hold the flexure member in position relative to the through-opening during pressurization, to ensure that the flexure member seals against the first body member.

A latch 36 is disposed on the first body member 16, extending through the through-opening 24. The latch 36 has a primary portion or stem 38 that is disposed in the opening 24. The latch 36 has a catch 40 that is joined to the outer end of the stem 38 and is disposed adjacent the outer end 25 of the through-opening 24. The latch 36 has a foot 42 that is joined to the inner end of the stem 38 and is disposed at the inner end 27 of the through-opening 24. The latch 36 is movable by the flexure member 30, relative to the first body member 16, from a uniform pressure position 44 to a differential pressure position 46. In the uniform pressure position 44, the first body member 16 is displaceable from the second body member 18 and the flexure member 30 is in communication with the through-opening 24. In the differential pressure position 46, the catch 40 retains the first body member 16 against the second body member 18 in pressure-tight relation and the foot 42 seals the through-opening 24 from the flexure member 30.

Figure 3:
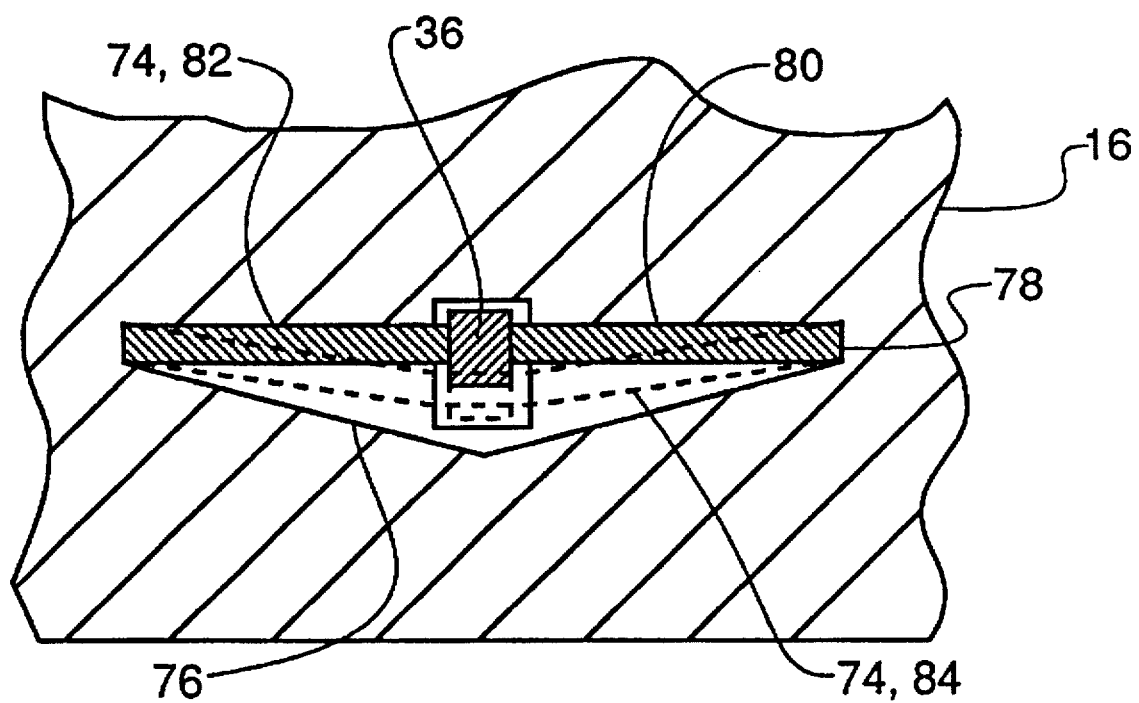
FIG. 3 is a cross-sectional view taken substantially along a plane perpendicular to the page and extending through line 3—3 in FIG. 1.

In the embodiment of the invention illustrated in FIGS. 1-3, the latch 36 is disposed in a through-opening 24 in the first body member 16 that is wedged shaped in cross-section, to accomodate the stem 38 of the latch 36 during the pivoting of the latch 36. The second body member 18 overlaps the first body member 16 and a second wedge shaped opening 48 extends outward from the opening 24 in the first body member 16. The catch 40 extends outward beyond the second body member 18 and, when the latch 36 is in the differential pressure position 46, bears on the strike 50 of the second body member 18. The foot 42 has an elongate arm 52 that extends opposite the catch 40 from the inner end 54 of the stem 38 to a free margin 56. When the flexure member 30 is forced outward by a pressure differential between the two areas 12,14, the flexure member 30 presses on the foot 42 and displaces the foot 42, and the rest of the latch 36, from the uniform pressure position 44 to the differential pressure position 46.

The latch 36 is rigid or substantially rigid and is pivotable about a pivot axis 58 that extends in a direction that is transverse, and preferably perpendicular, to a plane defined by the length dimension of the stem 38 from end to end and by the length dimension of the arm 52 from the inner end 54 of the stem 38 to the free margin 56. In FIGS. 1 and 2, this plane is the plane of the sheet of paper on which the figures were illustrated. The pivot axis 58 is offset from the stem 38 and, in the embodiments of FIGS. 1 and 2 extends through the foot 42 of the latch 36.

The arm 52 and catch 40 are arranged as a pair of opposed lever arms. The relative lengths of the arm 52 and catch 40 are proportioned to provide a mechanically advantage for movement of the latch 36 from the uniform pressure position 44 to the differential pressure position 46. This mechanical advantage is useful for compressing or flexing a gasket or other resilient structure, or the body members as a whole, to ensure a pressure-tight relation as the body members are brought into the closed position. This mechanical advantage also helps deter inadvertent movement of the latch in the presence of a substantial pressure differential between the two areas 12,14.

A further deterrence to inadvertent movement of the latch 36 is provided by the flexure member 30, which can act as an air spring against a compressive force imposed by the arm 52 of the latch 36. This function is best provided by a flexure member 30 in the form of an inflatable pouch or bag. This is illustrated in the embodiment shown in FIGS. 4–5. The stem 38 of the latch 36 and the second body member 18 have engagement surfaces 60,62 that are substantially complementary in shape and in radial relation to the pivot axis 58. It is preferred that the engagement surfaces 60,62 are each substantially planar and substantially radial to the pivot axis 58, so as to deter contact between the engagement surfaces 60,62 when the latch 36 is not in the differential pressure position 46. The latch 36 and first body member 16 have secondary contact surfaces 64,66 interior to the engagement surfaces 60,62. The secondary contact surfaces 64,66 are shaped so as to not interfere with engagement of the engagement surfaces 60,62. The secondary contact surfaces 64,66, preferably, form extensions of the respective engagement surfaces 60,62 and are likewise substantially planar and substantially radial to the pivot axis 58.

In the embodiment of the invention shown in FIGS. 1–2, the engagement and secondary contact surfaces 60,62 and 64,66 define a plane, indicated by a dashed line 68 in FIG. 2, that includes the pivot axis 58. The included angle between the engagement surface 60 of the latch 36 and the catch 40 is substantially 90 degrees. The latch 36 has a beating surface 70 adjoining the foot 42, opposite the arm 52. The first body member 16 has a complementary bearing surface 72 adjoining the latch beating surface 70. The beating surfaces 70,72 can be cylindrical or spherical. The bearing surfaces 70,72 each have a substantially uniform radial separation from the pivot axis 58 when the latch 36 is in the differential pressure position 46.

The latch 36 can float freely within the through-opening 24 such that the bearing surfaces 70,72 are not necessarily in contact when the latch 36 is in the uniform pressure position 44. It is preferred, however, that the latch 36 be mounted within the first body member 16 such that the bearing surfaces 70,72 are in continuous contact. This can be provided, as shown in FIGS. 1–3, by use of a resilient member 74. The resilient member 74 also provides additional functions. The resilient member 74 holds the latch 36 in place when the body members 16,18 are placed in the open position 26. The resilient member 74 also acts on the latch 36 to return the latch 36 from the differential pressure position 46 to the uniform pressure position 44 when pressures between the two areas 12,14 become substantially equal. The resilient member 74 is shaped like a pin or leaf spring and extends through the stem of the latch 36, substantially parallel to the pivot axis 58. The resilient member 74 is disposed within a recess 76 in the first body member 16. The ends 78 of the resilient member 74 are held firmly in place. The recess 76 is configured in a roughly triangular shape to permit the resilient member 74 to flex, such that during closure of the latch 36, as latch stem 38 pivots about the pivot axis 58, the middle portion 80 of the resilient member 74, being unconstrained, is translated by the stem 38. Since the ends 78 of the resilient member 74 are constrained from translation, the resilient member 74 is bent elastically, from a straight conformation 82, indicated by solid lines in FIG. 3, to a flexed configuration 84, indicated by a dashed line in FIG. 3. When the latch 36 is no longer held in the differential pressure position 46, that is, when the differential pressure is removed from the foot 42 of the latch 36, the resilient member 74 straightens and thereby moves the latch 36 from the differential pressure position 46 to the uniform pressure position 44. The resilient member 74 can also retain the latch 36 within the first body member 16.

The latch 36 has a lower shear strength than the body members 16,18. Thus, an impact on the latch 36 is more likely to break the latch 36 than one of the body members 16,18 resulting in the latch 36 falling out leaving a large hole in the pressure vessel 10 or other structure. The resulting damage is very visible, and prevents full pressurization.

Referring now to the embodiment of FIGS. 1–3, in operation, as pressure within the first area 12 begins to increase relative to the second area 14, the flexure member 30 begins to expand against the foot 42. The higher pressure against the foot 42 causes the latch 36 to pivot about the pivot axis 52. The pivoting continues until the engagement surfaces 60,62 and secondary contact surfaces 64,66 engage and the catch 40 bears on the strike 50, stopping further pivoting. Because the engaged engagement surfaces 60,62 and secondary contact surfaces 64,66 are substantially radial to the pivot axis 58, no couple exists in the latch 36 and therefore there is no opening torque generated in the latch at higher pressures, and the latch remains closed. This is an advantage provided by the invention. If the latch had a pivot axis moved toward the beating surfaces from its present location (toward the right of item 38 in FIGS. 1–2), the strike would have to be bevelled to accept the latch as it closed, resulting in an insecure closure. If the latch had a pivot axis moved toward the free margin (to the left of item 38 in FIGS. 1–2), the strike would not be able to have a 90° corner, and both the underside of the catch and the strike would have to be radially relieved to provide a secure latch.

Figure 4:
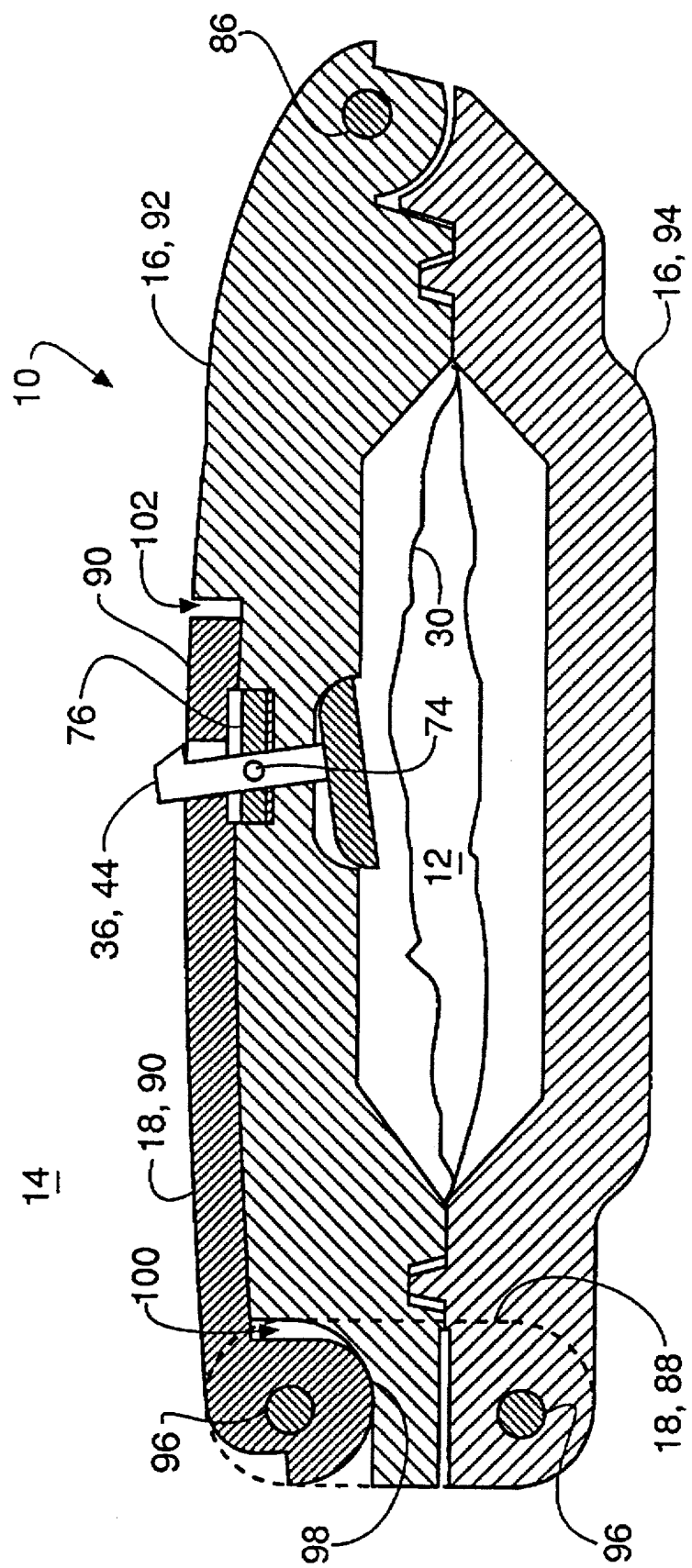
FIG. 4 is a cross-sectional view of an embodiment of the pressure vessel of the invention. The latch is in the uniform pressure position.
Figure 5:
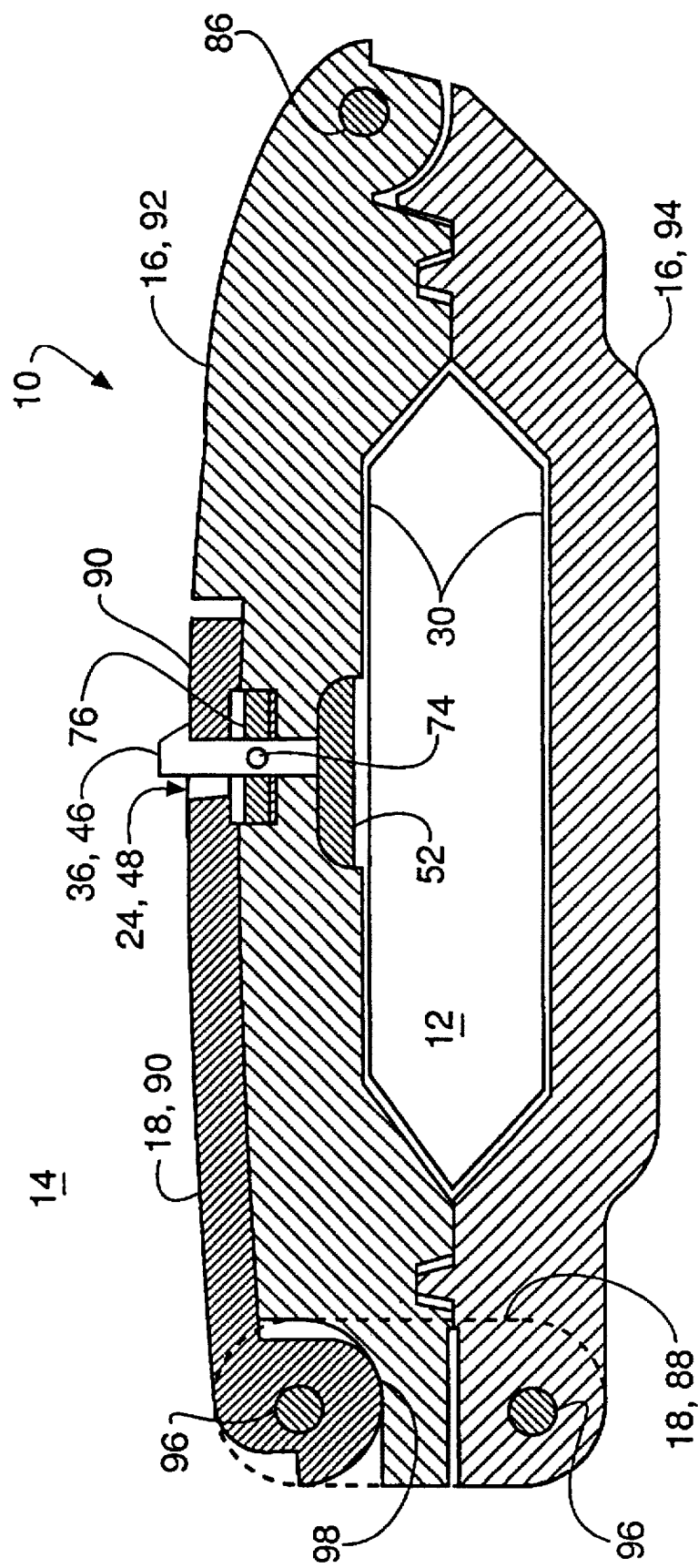
FIG. 5 is the same view as in FIG. 4, except the latch is in the differential pressure position.

Referring now to FIGS. 4–5, in particular embodiments of the invention, the body members 16,18 of the pressure lock assembly 10 are configured such that the pressure lock assembly is also a pressure vessel. In the embodiment illustrated in FIGS. 4–5, the first body member 16 has the form of a clamshell joined at one end by a hinge 86 and at the other by the second body member 18. When the latch 36 is in the uniform pressure position 44, as shown in FIG. 4, the exterior 14 and interior 12 of the vessel 10 are at ambient pressure and the first body member 16 can be opened. When the latch 36 is in the differential pressure position 46, as shown in FIG. 5, the latch 36 engages the second body member 18 and prevents the opening movement of the first body member 16. The flexure member 30 has the form of an inflatable pouch. Water or other aqueous solution is sealed within the pouch 30 along with articles to be sterilized and the pressure vessel 10 is placed in a heating apparatus (not shown). When the water in the pouch 30 is heated, as by radiant heating or microwaves, steam is generated which expands the pouch 30 against the inside of the first body member 16, causing the latch 36 to engage the second body member 18.

The second body member 18 has a link portion 88 (indicated by dashed lines in FIG. 5) and a lever portion 90. One end of the link portion 88 is hinged to one of the shells 92,94 of the first body member 16 by a hinge pin 96. The lever portion 90 is hinged to the other end of the link portion 88 by another hinge pin 96. The vessel 10 is opened by rotation of the members 16,18 and shells 92,94 about the hinge pins 96. When the vessel 10 is closed, the link portion 88 is oriented transverse to both body members 16,18 as shown in FIG. 5, by means of a slot in the body members 16,18 or interdigitation of the link portion 88, the lever portion 90 and the shells 92,94 or the like (not shown). The lever portion 90 has a cam surface 98 that is disposed in a socket 100 in the first body member 16. Rotation of the cam surface 98 of the lever portion 90 forces the shells 92,94 into pressure-tight relation. The free margin 56 of the foot 42 of the latch 36 is curved. In the differential pressure position 46 shown in FIG. 5, the foot 42 is disposed within a complementary recess 102 in the first body member 16. The flexure member 30 is a sealed pouch containing water or an aqueous solution. When the water is heated, the flexure member 30 inflates from steam pressure within, causing the latch 36 to pivot from the uniform pressure position 44 shown in FIG. 4 to the differential pressure position 46 shown in FIG. 5. When pressure in the flexure member 30 is relieved, for example, by cooling, the flexure member 30 deflates and the latch 36 returns to the uniform pressure position 44 under the action of the resilient member 74.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

PARTS LIST pressure lock assembly 10
first independently pressurized area 12
second independently pressurized area 14
first and second body members 16,18
inner or high pressure surface 20
outer or low pressure surface 22
through-opening 24
exterior and interior ends 25,27
open position 26
closed position 28
flexure member or membrane 30
relaxed configuration 32
pressurized configuration 34
latch 36
primary portion or stem 38
catch 40
foot 42
uniform pressure position 44
differential pressure position 46
second wedge shaped opening 48
strike 50
arm 52
inner end 54
free margin 56
pivot axis 58
engagement surfaces 60,62
secondary contact surfaces 64,66
a plane, indicated by a dashed line 68
bearing surfaces 70,72
resilient member 74
recess 76
ends 78
middle portion 80
straight conformation 82
flexed configuration 84
hinge 86
link portion 88
lever portion 90
shells 92,94
hinge pins 96
cam surface 98
socket 100
recess 102

What is claimed is:

1. A pressure lock assembly for use between first and second independently pressurized areas, said pressure lock assembly being actuated when said first area has a substantially higher pressure than said second area, said pressure lock assembly being deactuated when said areas have substantially uniform pressures, said pressure lock assembly comprising:

first and second body members, said first body member having an inner surface bounding said first area and an outer surface bounding said second area, said first body member having a through-opening, having an inner end, extending between said surfaces, said body members being displaceable between an open position wherein said body members are at least partially disengaged and a closed position wherein said body members are closely engaged;

a flexure member disposed adjacent said inner end of said through-opening, said flexure member being disposed in a relaxed configuration wherein said flexure member is unsealed from first body member, when said areas have said substantially uniform pressures, said flexure member being disposed in a pressurized configuration wherein said flexure member is sealed against said first body member, when said first area has said substantially higher pressure than said second area;

a latch disposed on said first body member, said latch having a stem, a catch, and a foot, said stem extending through said through-opening, said catch and said foot being disposed at opposite ends of said stem, said latch being movable by said flexure member, relative to said first body member, from a uniform pressure position wherein said first body member is displaceable from said second body member and said said flexure member is in communication with said through-opening, to a differential pressure position wherein said catch retains said first body member against said second body member in pressure-tight relation and said foot seals said through-opening from said flexure member.

2. The pressure lock assembly of claim 1 wherein said latch is pivotable between said uniform pressure position and said differential pressure position about a pivot axis and said latch and said second body member have engagement surfaces which are substantially complementary in shape and in radial relation to said pivot axis.

3. The pressure lock assembly of claim 2 wherein said latch and said first body member have complementary bearing surfaces, each said bearing surface having a substantially uniform radial separation from said pivot axis when said latch is in said differential pressure position.

4. The pressure lock assembly of claim 3 wherein said bearing surfaces are cylindrical and said pivot axis extends through said foot.

5. The pressure lock assembly of claim 2 wherein said latch is substantially rigid.

6. The pressure lock assembly of claim 2 further comprising a resilient member biasing said latch toward said uniform pressure position.

7. The pressure lock assembly of claim 6 wherein said resilient member retains said latch in said first body member when said body members are in said open position.

8. The pressure lock assembly of claim 7 wherein said latch has a lower shear strength than said body members.

9. The pressure lock assembly of claim 6 wherein said first body member has a recess, and wherein said resilient member has a pair of opposed ends and a midportion between said ends, said midportion being joined to said latch, said ends closely engaging said recess, said midportion being movable within said recess to flex said resilient member.

10. A pressure lock assembly for use between first and second independently pressurized areas, said pressure lock assembly being actuated when said first area has a substantially higher pressure than said second area, said pressure lock assembly being deactuated when said areas have substantially uniform pressures, said pressure lock assembly comprising:

first and second body members, said first body member having an inner surface bounding said first area and an outer surface bounding said second area, said first body member having a through-opening extending between said surfaces, said through-opening having inner and outer ends, said body members being displaceable between an open position wherein said body members are at least partially disengaged and a closed position wherein said body members are closely engaged;

a flexure member disposed adjacent said inner end of said through-opening, said flexure member being disposed in a relaxed configuration wherein said flexure member is loosely disposed in proximity to said first body member, when said areas have said substantially uniform pressures, said flexure member being disposed in a pressurized configuration wherein said flexure member is pressed tightly against said first body member, when said first area has said substantially higher pressure than said second area;

a latch disposed on said first body member, said latch having a stem extending through said through-opening, said stem having a catch disposed adjacent said outer end of said through-opening and a foot disposed at said inner end of said through-opening, said latch being resiliently pivotable by said flexure member, about a pivot axis offset from said stem, from a uniform pressure position wherein said first body member is displaceable from said second body member and said said flexure member is in communication with said through-opening, to a differential pressure position wherein said catch retains said first body member against said second body member in pressure-tight relation and said foot seals said through-opening from said flexure member.

11. The pressure lock of claim 10 wherein said stem and said second body member have complementary engagement surfaces, said engagement surfaces each being substantially radial to said pivot axis, said engagement surfaces being engaged when said latch is in said differential pressure position.

12. A pressure vessel for use with a heat source to heat a fluid within said pressure vessel from ambient pressure liquid to superambient pressure steam and to condense said steam within said pressure vessel to ambient pressure liquid, said pressure vessel comprising:

a body having first and second body members, said first body member having a through-opening, said through-opening having inner and outer ends, said members being displaceable between an open position wherein said members are at least partially disengaged and a closed position wherein said members are closely engaged and define a pressure chamber for said fluid;

a flexure member disposed adjacent said inner end of said through-opening, said flexure member, in the presence of said ambient pressure liquid, being disposed in an unexpanded configuration wherein said flexure member loosely engages said first body member, said flexure member, in the presence of said superambient pressure steam, being disposed in an expanded configuration wherein said flexure member presses tightly against said first body member;

a latch mounted on said first body member, said latch having a stem extending through said through-opening, said stem having a catch disposed at said outer end of said through-opening and a foot disposed at said inner end of said through-opening, said latch being movable by said flexure member, relative to said first body member, from an uniform pressure position wherein said first body member is displaceable from said second body member and said said flexure member is in communication with said through-opening, to a differential pressure position wherein said catch retains said first body member against said second body member in pressure-tight relation and said foot seals said through-opening from said flexure member.

13. The pressure vessel of claim 12 wherein said latch is substantially rigid.

14. The pressure vessel of claim 13 wherein said latch is pivotable between said uniform pressure position and said differential pressure position about a pivot axis and said latch and said second body member have complementary engagement surfaces, said engagement surfaces each being substantially radial to said pivot axis.

15. The pressure vessel of claim 14 wherein said latch and said first body member have complementary bearing surfaces, each said bearing surface having a substantially uniform radial separation from said pivot axis when said latch is in said differential pressure position.

16. The pressure vessel of claim 14 wherein said bearing surfaces are cylindrical.

17. The pressure vessel of claim 14 further comprising a resilient member biasing said latch toward said uniform pressure position.

18. The pressure vessel of claim 17 wherein said resilient member retains said latch in said first body member when said body members are in said open position.

19. The pressure vessel of claim 18 wherein said latch has a lower shear strength than said body members.

20. The pressure vessel of claim 19 wherein said first body member has a pin recess, and wherein said resilient member is further characterized as a flexible pin extending transverse to said latch, said pin having a pair of opposed pin ends and a midportion between said ends, said midportion being joined to said latch pin, said pin ends closely engaging said pin recess, said midportion being movable within said pin recess to flex said pin.

* * * * *